United States Patent
Fitzgerald et al.

(10) Patent No.: US 6,378,688 B1
(45) Date of Patent: Apr. 30, 2002

(54) PROPORTIONAL GATE MECHANISM FOR A CONVEYOR AND METHOD

(75) Inventors: Jonny Fitzgerald, Garland; Thomas G. Knodell, Jr., Fort Worth; Kenneth C. Petri, Richardson; P. Blake Svejkovsky; Paul S. Svejkovsky, both of Marquez, all of TX (US)

(73) Assignee: Paul A Svejkovsky, Marquez, TX (US)

( * ) Notice: Subject to any disclaimer, the term of this patent is extended or adjusted under 35 U.S.C. 154(b) by 0 days.

(21) Appl. No.: 09/842,748

(22) Filed: Apr. 25, 2001

Related U.S. Application Data

(63) Continuation-in-part of application No. 09/665,142, filed on Sep. 19, 2000, now Pat. No. 6,286,665, which is a continuation of application No. 09/251,516, filed on Feb. 17, 1999, now Pat. No. 6,119,849.

(51) Int. Cl.$^7$ ............................................. B65G 47/10
(52) U.S. Cl. ........................ 198/370.01; 198/750.1; 198/360
(58) Field of Search ................................ 198/359, 360, 198/370.01, 443, 369.3, 369.7, 436, 445, 750.1, 530, 531

(56) References Cited

U.S. PATENT DOCUMENTS

| | | | | | |
|---|---|---|---|---|---|
| 3,031,064 A | * | 4/1962 | Kline | ........................... | 198/359 |
| 3,223,228 A | * | 12/1965 | Ferris et al. | ................. | 198/359 |
| 3,258,165 A | * | 6/1966 | Guyer | ..................... | 198/360 X |
| 3,279,592 A | * | 10/1966 | Kerkvliet | ..................... | 198/359 |

FOREIGN PATENT DOCUMENTS

| | | | | |
|---|---|---|---|---|
| GB | 1208977 | * | 10/1970 | ............ 198/370.01 |

* cited by examiner

*Primary Examiner*—James R. Bidwell
(74) *Attorney, Agent, or Firm*—Loren G. Helmreich; Browning Bushman, P.C.

(57) ABSTRACT

A discharge gate mechanism or structure for proportioning a volume of goods between two flow streams. The gate discharge structure includes a one-piece tube 22 having a gate discharge opening 92 therein. A feed trough 20 is connected to tube 22 for reciprocal simultaneous movement with tube 22 for moving the goods along trough 20 and tube 22. A motor 86 is effective to rotate tube 22 and opening 92 therein relative to feed trough 20 to position discharge opening 92 at a desired location for controlling the discharge of goods between two flow streams.

20 Claims, 4 Drawing Sheets

US 6,378,688 B1

PROPORTIONAL GATE MECHANISM FOR A CONVEYOR AND METHOD

REFERENCE TO RELATED APPLICATIONS

This application is a continuation-in-part of application Ser. No. 09/665,142, filed Sep. 19, 2000, now U.S. Pat. No. 6,286,665 which is a continuation of application Ser. No. 09/251,516 filed Feb. 17, 1999, now U.S. Pat. No. 6,119,849 issued Sep. 19, 2000.

FIELD OF THE INVENTION

The present invention relates to an improved gate mechanism for a feed conveyor of the type which cyclically moves goods along the feed conveyor to a tubular discharge member. More particularly, this invention relates to a gate mechanism having a rotatable tubular discharge member with a gate discharge opening and particularly adapted for the transport and discharge of fragile goods.

BACKGROUND OF THE INVENTION

Various types of gate mechanisms have been devised for particular types of conveyors. Conveyors with a generally tubular construction, such as screw conveyors and conveyors of the type disclosed in U.S. Pat. No. 3,586,155, may employ a rotary gate mechanism to either allow product to discharge through the opened gate or to move product downstream from the closed gate. Various types of rotary gate mechanisms are disclosed in U.S. Pat. Nos. 1,401,155, 3,074,534, 3,077,975, and 3,342,315. U.S. Pat. No. 4,023,675 discloses a slide door for use with a chain conveyor. U.S. Pat. No. 3,731,787 discloses a slide gate with sensors.

An increasingly common type of conveyor utilizes a substantial planar tray floor and a cyclically powered drive mechanism cyclically powered to move the goods along the tray floor. One type of conveyor which utilizes such a cyclically powered tray is a vibratory conveyor, and another type of conveyor which uses a similar cyclically powered tray is a linear motion conveyor. Both vibrating and linear motion conveyors commonly employ substantially planar tray floor with opposing sides, and thus are sometimes referred to as a trough-type conveyor. The stroke in a vibratory conveyor is relatively short, and typically is approximately 1/16th of an inch, so that the tray imparts an upward and forward motion to the goods. The tray is returned to its original position while the goods are out of contact with the tray floor. A linear motion conveyor has a much longer stroke, typically in the range of approximately an inch and a half, and moves the goods slowly forward and returns the tray quickly while the goods slide along the tray floor. A slide gate for a trough-type conveyor is disclosed in U.S. Pat. No. 2,716,741. More complex and specialized types of gates for conveyors with a planar tray floor are disclosed in U.S. Pat. Nos. 3,042,360, 3,315,792, and 3,511,303.

Conventional gate mechanisms for conveyors with a planar tray floor have various problems which have limited their acceptance in the industry. Traditional gate mechanisms are intended to operate in the fully opened or fully closed position. This limitation prevents equipment downstream from the conveyor from receiving a steady flow of product, and thus results in poor production efficiency. Some conveyor manufacturers have attempted to overcome this problem by utilizing triangular shaped cutouts in the conveyor floor and allowing the gate mechanism to be positioned at selected intervals between the fully opened and fully closed position. The use of such triangular shaped cutouts requires a great deal of space along the length of the conveyor, and also requires a linear actuator which is capable of sliding the gate over a relatively long movement.

A significant problem with slide type gate mechanisms for trough-type conveyors with a planar tray floor involves the inability of a gate to completely seal in the closed position. Trough-type conveyors are commonly used to transport snack foods and fine particles associated with such goods have caused a growing problem when high hygiene is critical. Some companies have required specialized devices to prevent unwanted particles, such as dust associated with a transported goods, from leaking out of a closed gate and into another product line. Many slide gates associated with trough-type conveyors have a difficult time sealing the gate area when in the closed position because product is passing through a gate while it is being closed. The product may thus become jammed in the gate sealing area, resulting in both product breakage and the buildup of material to prevent complete gate closing. A related problem is that the gate seal is commonly exposed to the product when the gate is partially or fully opened. As the product passes by the gate seal, the sealing material is worn and thus prevents a reliable seal from substantially being formed when the gate is in the closed position.

The disadvantages of the prior art are overcome by the present invention, and an improved gate mechanism is hereinafter disclosed for a trough-type conveyor. The gate mechanism of the present invention is positioned over the conveyor and may be used on either vibratory conveyors or horizontal motion conveyors. The improved gate mechanism has minimal parts to provide a long life and a reliable operation.

SUMMARY OF THE INVENTION

The gate structure or mechanism of the present invention is particularly suited for use with a conveyor for moving fragile goods along an elongate tray and includes a rotary gate mechanism mounted along the conveyor. A powered drive mechanism operatively connected to the tray is effective for cyclically moving fragile goods along the conveyor and the discharged goods may move along a similarly powered downstream tray. The gate mechanism of the present invention comprises a one-piece circular discharge tube or member with a gate discharge opening formed about 120 degrees of the circumference of the circular discharge tube. The circular discharge tube is positioned over the downstream tray and is rotated to a desired position. When the opening is at its lowermost centered position, the entire volume of the goods being transported may be discharged through the gate opening onto the tray. When the opening is positioned at its uppermost centered position by rotation of the circular discharge tube, the entire volume of goods being transported along the circular discharge tube move past the gate discharge opening and no goods are discharged through the gate discharge opening onto the lower tray. As a result, the entire volume of goods is discharged from the downstream end of the circular discharge tube onto another downstream conveyor. The circular discharge tube may be rotated to any desired intermediate position for discharging any desired percent or proportion of the goods and thereby provide a desired volume of goods on each of the downstream trays. The goods moving past the gate discharge opening may be discharged from the downstream end of the circular discharge tube onto the second downstream conveyor.

A powered drive mechanism is operatively connected to the circular discharge tube for reciprocating the circular discharge tube for movement of the goods along the circular discharge tube and either into or past the gate discharge opening. The driving mechanism relies on the reciprocation of the discharge tube for transport of the goods along the circular discharge tube. As indicated, the gate discharge opening may be positioned by selective rotation of the circular discharge tube to any desired position for discharging all or a desired portion of the goods onto the tray. Sensors may be provided along the length of the conveyor to sense the depth of the goods discharged onto the conveyor and data from the sensors may be processed by a computer to control the rotation of the circular discharge tube to a desired position of the gate discharge opening for controlling the volume of goods being discharged through the gate discharge opening.

An object of the invention is to provide a simple gate mechanism which may be easily assembled and disassembled from a location over the tray of a subjacent conveyor on which goods are discharged from a gate discharge opening.

It is a further object to provide a gate mechanism for a conveyor which minimizes damage to goods transported by the conveyor during discharge of the goods onto the conveyor from a gate opening in a circular discharge tube or member.

An additional object is the provision of such a gate mechanism which may be easily mounted over the conveyor without any changes or modifications in the conveyor thereby to provide a simplified hook up or connecting procedure for the gate mechanism which is easily utilized with existing cyclically powered conveyors.

Still another object of the invention is to provide a one-piece circular discharge tube for the discharge of fragile goods from a discharge opening in the discharge tube onto a conveyor having a cyclically movable tray with a tray floor to receive the goods.

A feature of the invention is to provide a circular discharge tube over a conveyor for the discharge of fragile goods from an opening in the discharge tube in which the movement of the goods along the circular discharge tube is obtained by reciprocation of the circular discharge member and without any separate member required for movement of the goods along the circular discharge tube for discharge from the discharge opening in the circular discharge tube.

It is a feature of the present invention that the gate mechanism may be used with either a vibratory conveyor or linear motion conveyor. A related feature of the invention is that the gate discharge mechanism is well suited for use with trough-type conveyors used in the food processing industry. Another feature of the invention is that the gate discharge mechanism may be easily and reliably controlled upon rotation of the circular discharge tube or member to regulate the partial discharge of goods from the circular discharge tube onto the tray of a subjacent conveyor. Yet another feature of the invention is that the gate discharge mechanism may be easily assembled and disassembled without any modification of the conveyor.

A significant advantage of the present invention is that the gate discharge mechanism is simple and utilizes only a single circular discharge tube or member. Such an arrangement is highly reliable and is provided at a relatively low cost with a long life.

These and further objects, features, and advantages of the present invention will become apparent from the following detailed description, wherein reference is made to the figures in the accompanying drawings.

BRIEF DESCRIPTION OF PREFERRED EMBODIMENTS

Figure 1:
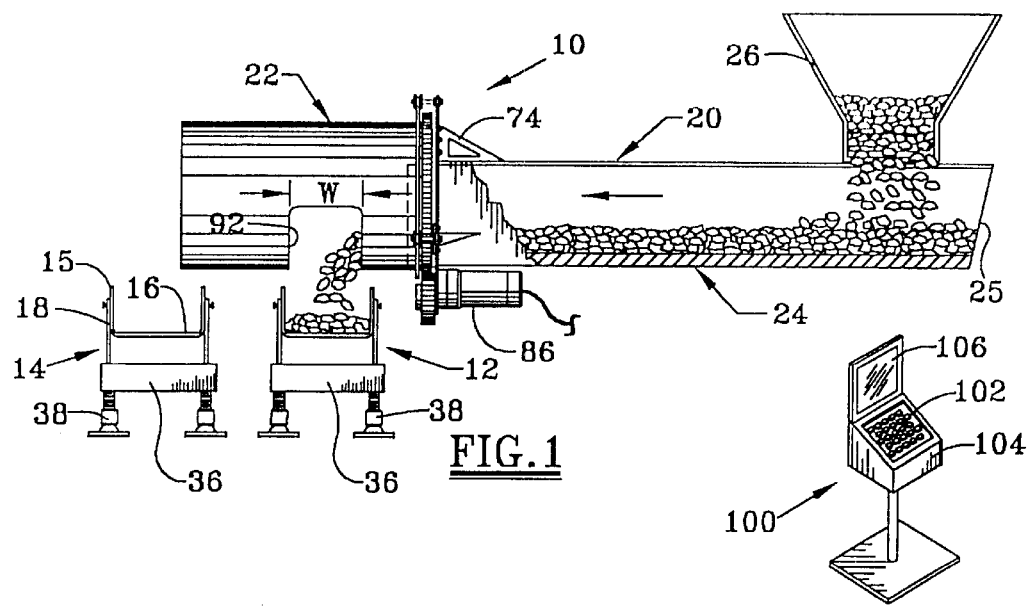
FIG. 1 is a side view of the conveyor system of the present invention and showing a gate discharge mechanism or structure mounted over a pair of linear motion conveyors having trays to receive fragile goods from a gate discharge tube or member.
Figure 2:
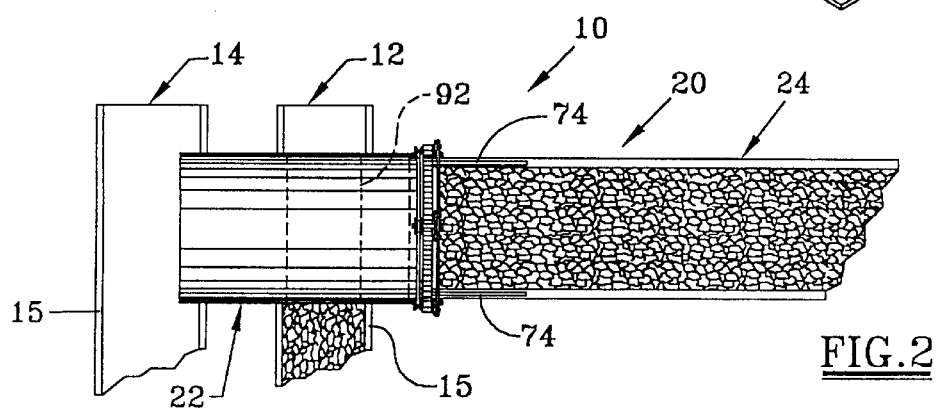
FIG. 2 is top plan view of the conveyor system of FIG. 1 showing the gate discharge member over the linear motion conveyors.

Referring to the drawings for a better understanding of the invention, FIGS. 1 and 2 illustrate the conveyor system of the present invention with a gate discharge structure or mechanism generally indicated at 10 positioned over a pair of linear motion trough type product receiving conveyors 12 and 14. Each conveyor 12, 14 includes a tray 15 defined by a substantial planar floor 16 and parallel sides 18 extending upwardly from floor 16. The gate discharge structure or mechanism 10 includes a feed supply assembly generally indicated at 20 connected to a gate discharge tube or member generally indicated at 22. Feed supply assembly 20 includes an open feed trough 24 defining an upstream conveyor tray for receiving fragile goods, such as potato chips, from a suitable hopper 26.

Figure 3:
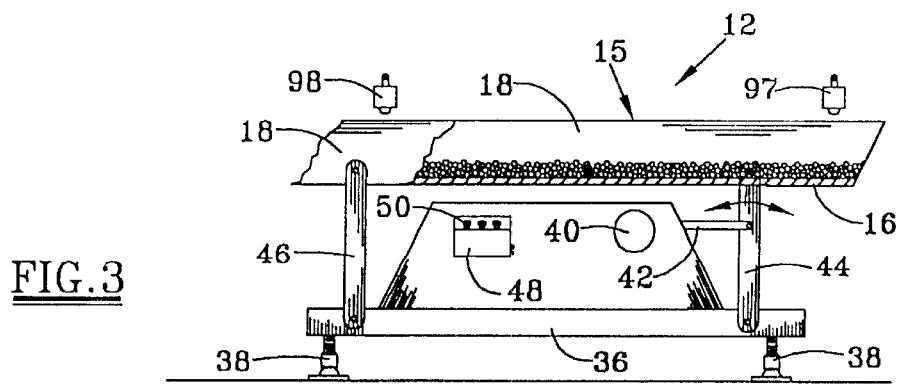
FIG. 3 is a side elevation, partly schematic, of a drive mechanism for a linear motion conveyor beneath the gate discharge member or tube.

Conveyor 12 as shown in FIG. 3 includes a base 36 supported on adjustable legs 38. A powered drive mechanism, such as a drive motor 40, is connected by a crank arm 42 to links or tray supports 44 connected to sides 18. Links 46 also support tray 15 and are pivotally connected to tray 15. A similar drive mechanism is provided for conveyor 14. Conveyors 12 and 14 are shown as linear motion conveyors and the powered drive mechanism moves tray 15 slowly forward and then more quickly backward in a cyclical manner with the goods sliding along the tray during backward movement of tray 15. A control station 48 is mounted on base 36 and operator controls 50 are provided for the powered drive mechanism to regulate the operation of motor 40 for the drive mechanism. Conveyor 14 is operated in a manner similar to conveyor 12 although it may be desirable to have only a single control station 48 for operation of both conveyors 12 and 14.

The product or goods from hopper 26 discharged into upstream trough or conveyor 24 of feed supply assembly 20 may be proportioned by volume between downstream conveyors 12 and 14 as may be desired. Trough or feed conveyor 24 may be of a generally semicircular shape having a closed end 25 and supplies goods to gate discharge tube 22 for discharge of the goods onto conveyors 12 and 14 in a desired volume proportion as may be predetermined. Trough 24 while shown as open may be closed as may be desired for sanitary reasons. Gate discharge tube 22 is connected to feed supply assembly 20 for simultaneous reciprocal longitudinal movement to move the goods along trough 24 to gate discharge tube 22.

Figure 4:
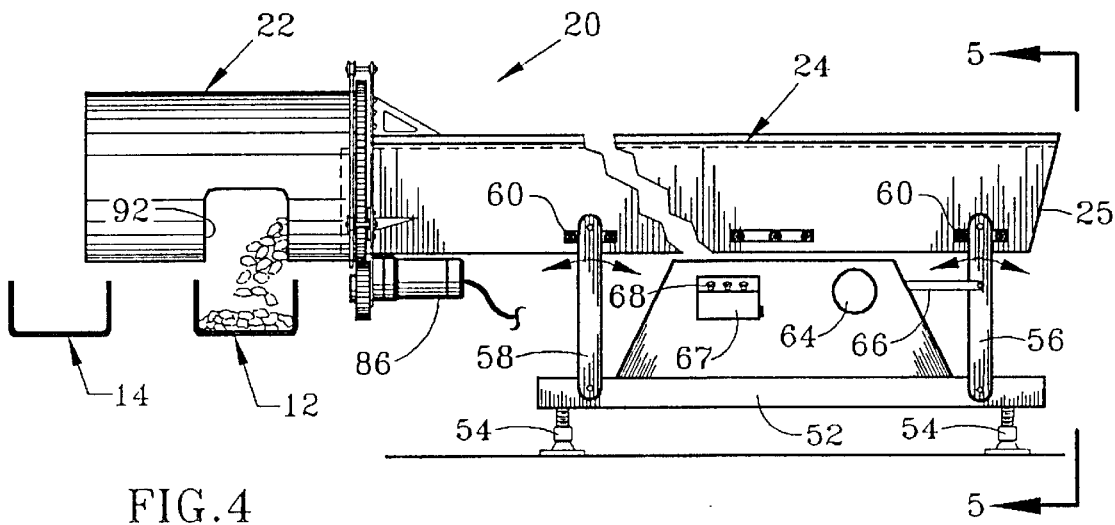
FIG. 4 is a side elevation, partly schematic, of the drive mechanism for the feed trough for simultaneously reciprocating the gate discharge member and the feed trough connected to the gate discharge member.
Figure 5:
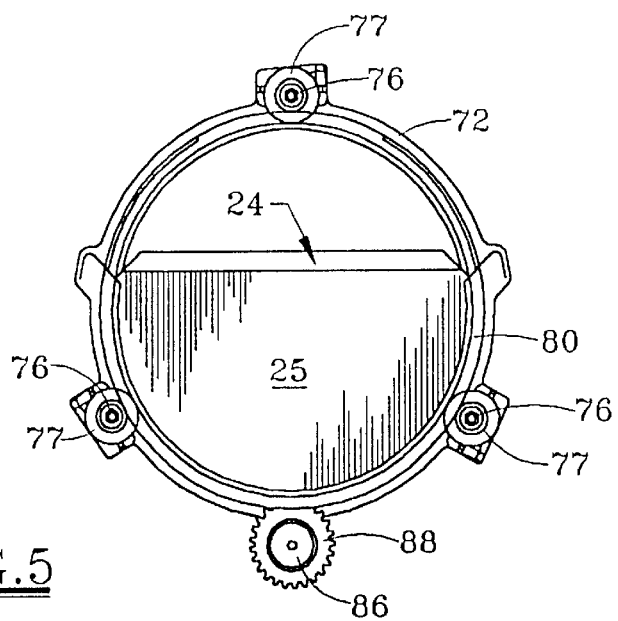
FIG. 5 is an end elevation of the gate discharge member and feed trough looking generally along line 5—5 of FIG. 4 and showing drive means for rotating the gate discharge member relative to the feed trough for supplying fragile goods to the gate discharge member.

As shown particularly in FIG. 4, a powered drive mechanism is connected to trough 24 to move trough 24 and gate discharge tube 22 back and forth in a cyclical or reciprocal relation. Base 52 has adjustable legs 54. Links 56 and 58 are pivotally connected to suitable brackets 60 on trough 24 at one end and to base 52 at a lower end. A motor 64 drives a crank arm 66 connected to links 56. Trough 24 and tube 22 have an arcuate floor and motor 64 is effective to move trough 24 and tube 22 slowly forward and then more quickly backward in a cyclical or reciprocal manner, with the goods sliding along trough 24 and tube 22 during the backward movement of the trough and tube. The goods are moved only by the cyclical or reciprocal movement of tube 22 and trough 24 and no further means are required or utilized for such movement. A control station 67 is mounted on base 52 and operator controls 68 are provided to regulate the operation of the drive mechanism for simultaneous longitudinal movement of feed trough 24 and tube 22.

Figure 6:
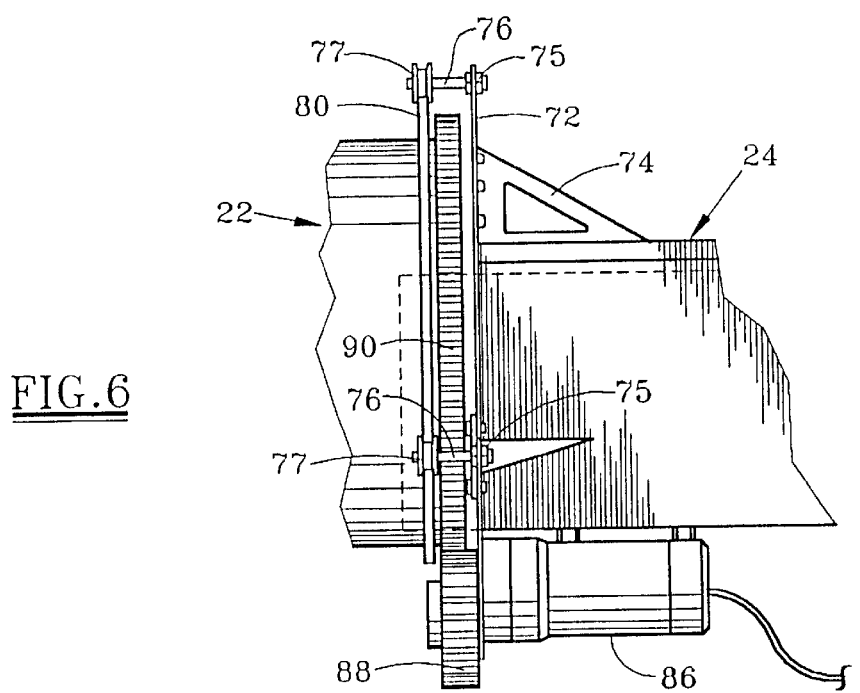
FIG. 6 is an enlarged fragment of FIG. 5 showing the drive mechanism for rotation of the gate discharge tube relative to the feed trough.
Figure 10:
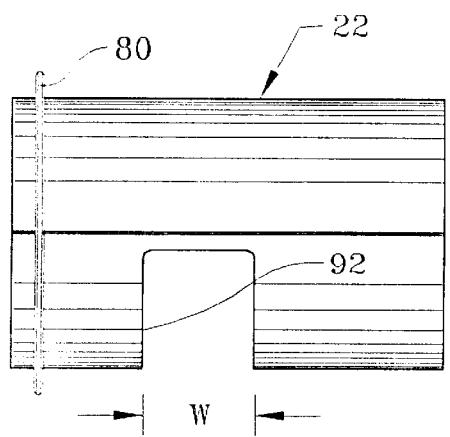
FIG. 10 is a side elevation of the gate discharge tube or member removed from the conveying system.

Tube 22 is mounted for selective rotation to a desired position relative to trough 24. As shown particularly in FIG. 6, trough 24 has a mounting plate 72 secured by brackets 74 to trough 24. Three bearings 75 mounted on plate 72 receive roller axles 76 for rollers 77. Tube 22 has a mounting ring 80 secured about its outer periphery which fits in v-shaped grooves in rollers 77 to permit rotation of tube 22 relative to trough 24. The drive mechanism includes an electric motor 86 mounted on plate 72 and trough 24. Motor 86 drives a drive gear 88 which meshes with a ring gear 90 secured to tube 22 for rotation of tube 22 and ring 80 supported on rollers 77. Tube 22 is shown in FIG. 10 removed from the system. Ring 80 is secured about tube 22 which may be formed of two halves welded together before ring 80 is mounted thereon.

Figure 7:
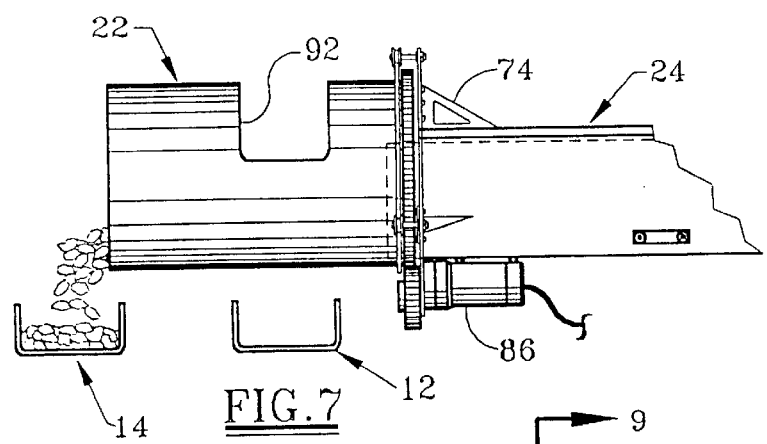
FIG. 7 is a side elevation showing the gate discharge opening and the gate discharge member rotated to the uppermost position of the gate discharge opening over the goods to a non-discharge position of the goods through the opening, all of the goods being discharged from the downstream end of the gate discharge member.

Tube 22 has an arcuate gate discharge opening 92 extending through the wall of tube 22 for about 120 degrees along the circumference of tube 22. Width W of gate discharge opening 92 is constant throughout its entire arcuate length. Any desired amount of the goods may be discharged from opening 92 into conveyor 12 with any remaining goods not discharged through opening 92 being discharged from the downstream end of tube 22 onto conveyor 14. FIGS. 1 and 4 show gate opening 92 at its lowermost centered position in which gate opening 92 is positioned beneath all of the goods moving along tube 22 and all of the goods are discharged through gate discharge opening 92 onto conveyor 12. Referring to FIG. 7, gate discharge opening 92 is positioned at is uppermost centered position above all of the goods moving along tube 22 and all of the product or goods are discharged from the downstream end of tube 22 onto conveyor 14 without any goods being discharged through gate discharge opening 92 onto conveyor 12.

Figure 9:
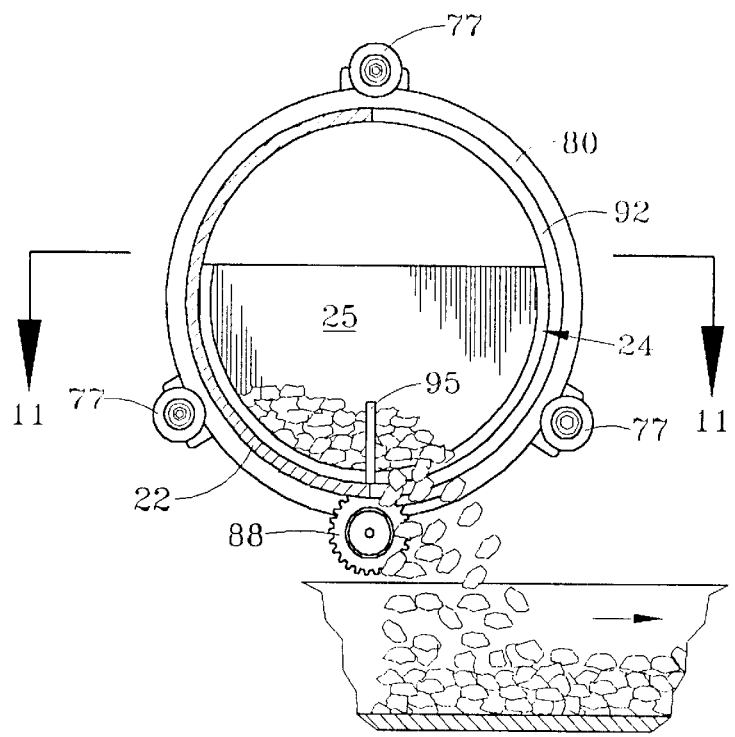
FIG. 9 is a section taken generally along line 9—9 of FIG. 8.
Figure 12:
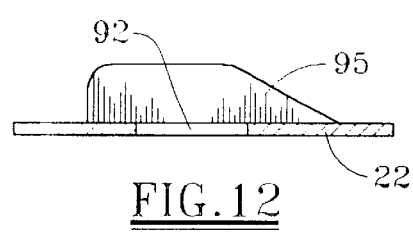
FIG. 12 is a side view of the fin shown in FIGS. 9 and 11.
Figure 11:
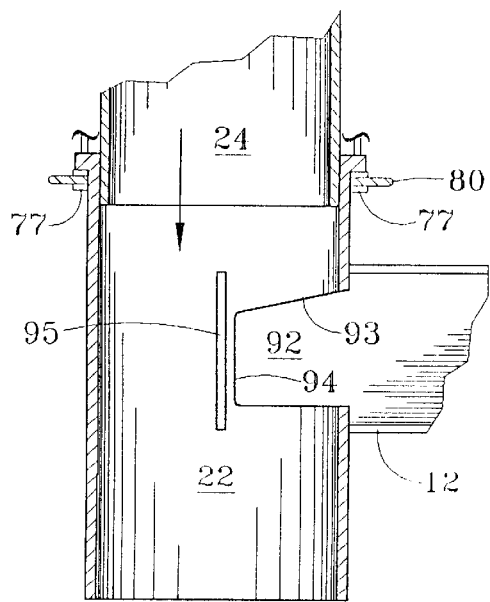
FIG. 11 is a cross-sectional view along lines 11—11 in FIG. 9, and illustrates a tapered discharge opening and a dividing fin.

The width W of the gate discharge opening could be tapered and thus vary circumferentially for better control of product fall-through. FIG. 11 illustrates a tapered upstream edge surface 93 for meeting this objective. Also, FIG. 11 discloses a longitudinal dividing fin 95 adjacent the edge 94 to prevent or minimize product to the left of fin 95 from falling out the opening 92. The fin 95 thus may extend upward (radially inward) several inches or more from the surface of tube 22, as shown in FIG. 9. The fin 95 acts as a guide to uniformly divide the product flow into two streams, with the ratio of product fall-through to product continuing downstream from the opening 92 being uniformly controlled. FIG. 12 illustrates the fin 95 with a triangular shaped upstream portion and a generally rectangular shaped downstream portion. The upstream portion of the fin is designed to minimize product damage. As shown in FIG. 12, the fin 95 extends from upstream of the opening 92 to downstream of the opening 92. Although FIG. 11 shows both a dividing fin 95 and a tapered upstream edge surface 93 for the discharge opening 92, these features may be used independently of each other since each feature also contributes to control of product fall-through rate.

Figure 8:
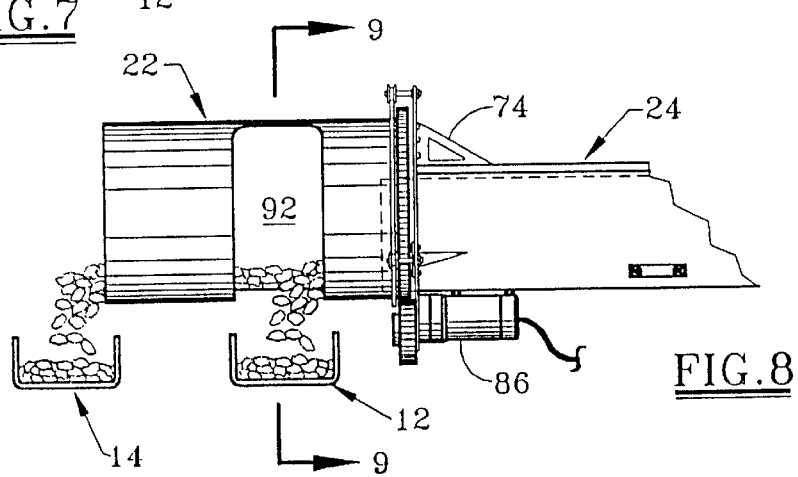
FIG. 8 is a side elevation showing the gate discharge opening in the gate discharge member rotated ninety (90) degrees from the lowermost position of the gate discharge opening of FIGS. 1 and 4 with the volume of goods proportioned between the two conveyors.

Referring to FIGS. 8 and 9, gate discharge opening 92 is shown at an intermediate position between the lowermost position of FIGS. 1 and 4 and the uppermost position shown in FIG. 7. Since only a portion of gate discharge opening 92 is beneath the goods, only a portion of the goods are discharged through opening 92 onto conveyor 12 and the remainder of goods are discharged from the downstream end of tube 22. It is apparent that any desired amount or volume of goods may be discharged through the gate discharge opening 92 onto conveyor 12 by selective rotation of tube 22.

The volume of goods may be proportioned in two flow streams between conveyors 12 and 14 from the position of gate discharge opening 92 which is controlled by rotation of tube 22 by motor 86. A plurality of volume depth measurement sensors, such as sensors 97 and 98 shown in FIG. 3, may be positioned over conveyors 12 and 14 and may utilize dual photo eyes for measurement of the depth of the goods by sensing the top layer of the goods being conveyed without contacting the product or goods moving along conveyors 12 and 14. Conveyors 12 and 14 may be sped up or slowed down to achieve the desired product rate for scales or baggers. Additional sensors may be provided as may be desired. While conveyors 12 and 14 are illustrated as receiving the goods from discharging tube 22, it is to be understood that other members, such as a hopper or bag may receive goods from discharge tube 22, if desired.

To operate the system, a control panel 100 may be provided to include an operator input keyboard 102, a computer 104, and a display screen 106. Operating parameters may be stored in computer 104 for determining the speed of conveyors 12, 14 and trough 20. Input signals from sensors 97, 98 from drive motors 40 for conveyors 12, 14, and from drive motor 64 are received by computer 104 for processing in relation to the position of gate discharge opening 92. Output signals to motor 86 are effective for rotation of gate discharge opening 92 to the desired position for proportioning the volume of goods between conveyors 12 and 14 in response to sensors 97, 98, and drive motors 40 and 64. Conveyors 12, 14 and trough 20 may also be operated manually from control panels 48 and 67. Motor 86 may also be controlled manually from control panel 67 if desired.

From the above, it is apparent that a simplified gate mechanism has been provided which may utilize a one-piece tube 22 with a gate discharge opening 92 therein that is rotated relative to a supply conveyor to a desired position of the gate discharge opening for proportioning the volume of goods between a pair of receiving members, such as conveyors 12 and 14. Additional receiving members and additional gate discharge openings could be provided if desired. The gate discharge mechanism is easily assembled over the receiving members such as conventional linear motion conveyors. While the discharge member is illustrated as a one-piece tube 22 with a circular cross-section, it is apparent that other discharge members would function in a satisfactory manner, such as non-circular members of various shapes including octagonal, pentagonal, and C shapes.

While a preferred embodiment of the present invention has been illustrated in detail, it is apparent that modifications and adaptations of the proposed embodiment will occur to those skilled in the art. However, it is to be expressly understood that such modifications and adaptations are within the spirit and scope of the present invention as set forth in the following claims.

What is claimed is:

1. A gate discharge for proportioning goods moving along a conveyor tray suppling goods to said gate discharge, said gate discharge comprising:
    a discharge member mounted for simultaneous reciprocation with said conveyor tray and rotation relative to said conveyor tray; and
    a discharge opening in said discharge member for selectively discharging goods through said discharge opening and past said discharge member.

2. The gate discharge as defined in claim 1, further comprising:
    a powered drive mechanism for rotating said member relative to said conveyor for positioning said discharge opening at a desired location for the discharge of goods through said gate discharge opening.

3. The gate discharge as defined in claim 1, further comprising:
    a powered drive mechanism simultaneously reciprocating said discharge member and said conveyor for the movement of goods along said conveyor and along said discharge member, said powered drive mechanism effective to move said conveyor and discharge members in a slow forward movement and then in a faster backward movement.

4. The gate discharge as defined in claim 1, wherein said discharge member has a generally tubular configuration.

5. The gate discharge as defined in claim 4, wherein said discharge member has a generally sleeve-shaped configuration.

6. The gate discharge as defined in claim 1, wherein said discharge opening extends circumferentially at least 90 degrees along said discharge member.

7. The gate discharge as defined in claim 1, wherein said discharge opening has a tapered upstream edge surface.

8. The gate discharge as defined in claim 1, further comprising:
    a longitudinal extending fin affixed to the discharge member adjacent the discharge opening and extending inward from the discharge member.

9. A conveyor with a gate discharge for both moving goods and selectively proportioning goods between a pair of downstream flow streams, said conveyor comprising:
    a conveyor tray for supporting the goods;
    a discharge member movable in response to reciprocal movement of the tray;
    a powered drive mechanism for reciprocating both the conveyor tray and the discharge member to move said goods along said conveyor tray and said discharge member;
    a powered drive mechanism for rotating said discharge member relative to said conveyor tray; and
    a gate discharge opening in said discharge member movable upon selective rotation of said discharge member to a position for the discharge of goods through said gate discharge opening in one downstream flow stream and for discharge of goods from a downstream end of said discharge member in another downstream flow stream, the position of said discharge opening determining the volume of goods proportioned between the flow streams.

10. The conveyor as defined in claim 9, wherein said gate discharge opening extends at least 90 degrees about the circumference of said discharge member.

11. The conveyor as defined in claim 9, wherein said discharge opening has a tapered upstream edge surface.

12. The conveyor as defined in claim 11, further comprising:
    a longitudinal extending fin affixed to the discharge member adjacent the discharge opening and extending inward from the discharge member.

13. The conveyor as defined in claim 9, wherein said discharge member has opposed open ends, one of said ends being an upstream end receiving goods for selective discharge of goods through said gate discharge opening, the other end of said discharge member being a downstream end for discharging a remainder of goods not discharged through said gate discharge opening.

14. The conveyor as defined in claim 9, further comprising:
    a receiving conveyor beneath said gate discharge opening to receive goods discharged from said gate discharge opening; and
    a powered drive mechanism for reciprocating said receiving conveyor for movement of goods along said receiving conveyor.

15. The conveyor as defined in claim 14, further comprising:
    a sensor for sensing an upper level of goods moving along said receiving conveyor and producing a signal relating to a volume of goods moving along said receiving conveyor; and
    a controller responsive to said signal for controlling rotation of said discharge member and thereby controlling a volume of goods being discharged through said gate discharge opening onto said receiving conveyor.

16. A method of proportioning goods moving along an upstream conveyor tray between first and second downstream receiving streams, said method comprising:
    providing a discharge member connected to said upstream conveyor tray and mounted for simultaneous reciprocation with said upstream conveyor tray;

providing a gate discharge opening in said discharge member for the related discharge of goods therethrough to said first downstream stream;

rotating said discharge member relative to said upstream conveyor tray for positioning said gate discharge opening at a selected position for the selected discharge of goods therethrough to said first downstream receiving stream;

passing a remainder of goods past said discharge opening to said second downstream receiving stream.

17. The method as defined in claim 16, further comprising:

sensing a volume of goods being discharged from said gate discharge opening and producing a signal to indicate the volume of goods being discharged; and controlling the rotation of said tubular discharge member in response to said signal thereby to control the volume of goods being discharged through said gate discharge opening.

18. The method as defined in claim 16, further comprising:

powering said conveyor tray and said discharge member to reciprocate forwardly at a relatively slow speed and backwardly at a relatively fast speed to move the goods along the conveyor tray.

19. The method as defined in claim 16, further comprising:

providing a receiving conveyor beneath said gate discharge opening to receive goods discharged from said gate discharge opening.

20. The method as defined in claim 19, further comprising:

powering said receiving conveyor to reciprocate forwardly at a relatively slow speed and to reciprocate backwardly at a relatively fast speed to move goods along said receiving conveyor.

* * * * *